United States Patent
Preller

(10) Patent No.: US 6,545,881 B2
(45) Date of Patent: Apr. 8, 2003

(54) METHOD FOR REGULATING A SWITCHED-MODE POWER SUPPLY AND SWITCHED-MODE POWER SUPPLY

(75) Inventor: Peter Preller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/078,115

(22) Filed: Feb. 19, 2002

(65) Prior Publication Data

US 2002/0105815 A1 Aug. 8, 2002

Related U.S. Application Data

(63) Continuation of application No. PCT/EP00/07958, filed on Aug. 16, 2000.

(30) Foreign Application Priority Data

Aug. 19, 1999 (DE) .......................... 199 39 389

(51) Int. Cl.[7] .............................. H02M 3/335
(52) U.S. Cl. .................................. 363/21.01
(58) Field of Search ........................... 363/15, 16, 20, 363/21.01, 21.02, 21.03, 21.04, 56.01, 95, 97, 131; 323/282, 283, 285

(56) References Cited

U.S. PATENT DOCUMENTS

| 4,295,188 A | | 10/1981 | Brunssen |
| 5,615,093 A | * | 3/1997 | Nalbant ....................... 363/25 |
| 5,815,569 A | | 9/1998 | Akhteruzzaman |
| 5,880,940 A | * | 3/1999 | Poon ........................... 363/20 |
| 6,188,587 B1 | * | 2/2001 | Yun et al. ..................... 363/21 |
| 6,353,543 B2 | * | 3/2002 | Itoh et al. ................. 363/21.01 |
| 6,434,023 B2 | * | 8/2002 | Preller ..................... 363/21.04 |

FOREIGN PATENT DOCUMENTS

| DE | 36 02 858 A1 | 8/1987 |
| DE | 44 03 731 C1 | 6/1995 |
| DE | 44 37 459 C1 | 11/1995 |

OTHER PUBLICATIONS

Internal Data Sheet TDA 16846/TDA 16847 by Infineon Technologies AG, dated Jan. 14, 2000, pp. 1–28.

* cited by examiner

*Primary Examiner*—Matthew Nguyen
(74) *Attorney, Agent, or Firm*—Laurence A. Greenberg; Werner H. Stemer; Ralph E. Locher

(57) ABSTRACT

A method for regulating a switched-mode power supply includes steps of: providing a switched-mode power supply having at least one electronic switch and a drive circuit having an input receiving a primary current simulation, the switched mode power supply supplying a relatively higher output power at times and a relatively lower output power at other times; as an output load decreases, lowering a switching frequency to reduce switching losses; and starting the step of lowering the switching frequency during an occurrence of the lower output power by, during a switch-on interval of the electronic switch, deforming a rise in a voltage at the input for receiving the primary current simulation such that the voltage rises more steeply during a time segment.

18 Claims, 4 Drawing Sheets

FIG 6                           PRIOR ART
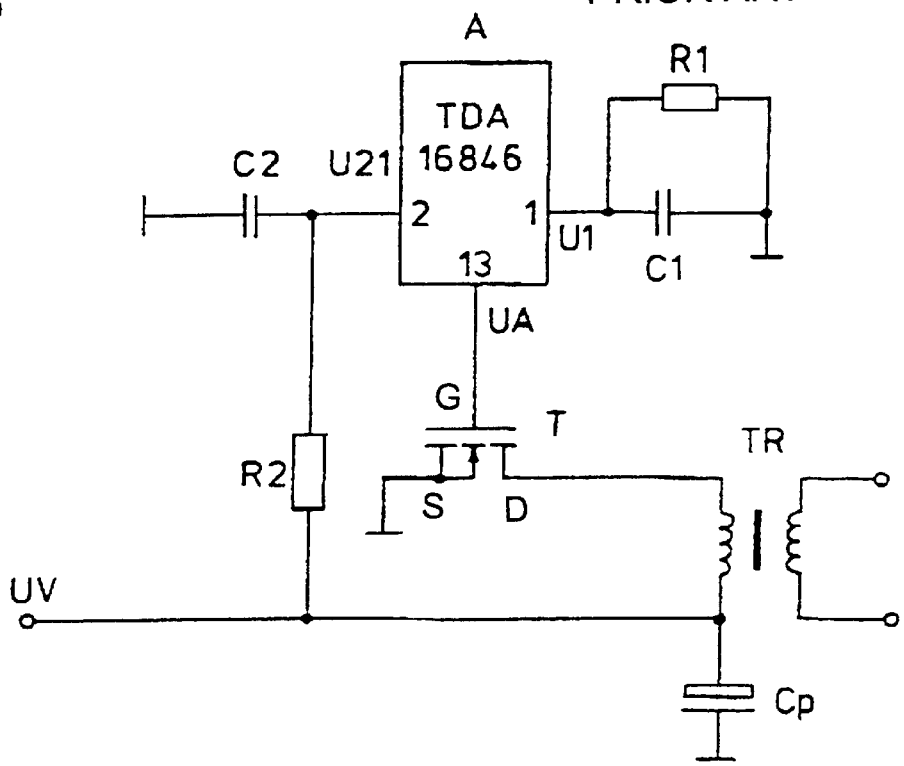
FIG 7
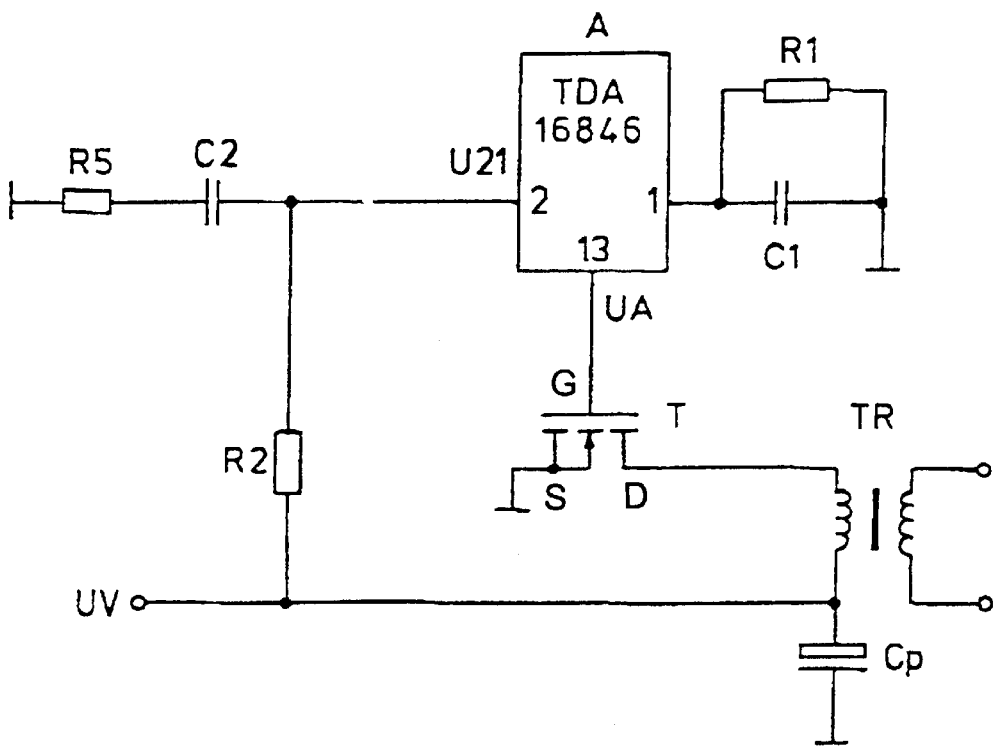

METHOD FOR REGULATING A SWITCHED-MODE POWER SUPPLY AND SWITCHED-MODE POWER SUPPLY

CROSS-REFERENCE TO RELATED APPLICATION

This application is a continuation of copending International Application No. PCT/EP00/07958, filed Aug. 16, 2000, which designated the United States.

BACKGROUND OF THE INVENTION

1. Field of the Invention

The invention relates to a method for regulating a switched-mode power supply having at least one electronic switch and a drive circuit with primary current simulation, in which case, as the output load decreases, the frequency is lowered to reduce switching losses.

The invention furthermore relates to a switched-mode power supply having at least one electronic switch and a drive circuit with primary current simulation, in which case, as the output load decreases, the frequency is lowered to reduce switching losses.

In a switched-mode power supply, a DC voltage is chopped by an electronic switch, for example, a switching transistor, into a square-wave voltage that is transformed using a transformer and subsequently rectified. The output voltage is regulated to a constant value using a regulator that controls the duty ratio or the frequency of the switching operation. Switched-mode power supplies are distinguished by a series of advantages when compared with conventional power supplies. Switched-mode power supplies are embodied as flyback converters, forward converters, or push-pull converters.

In order to reduce switching losses in a switched-mode power supply as the output load decreases, the frequency is lowered in frequency jumps which, however, can cause disturbances in some areas of use. Thus, by way of example, when the frequency is lowered by frequency jumps when a switched-mode power supply is used in a television set, the picture geometry is considerably impaired. Although such disturbances can be reduced by adapting the regulating characteristic, the outlay for this is considerable.

2. Summary of the Invention

It is accordingly an object of the invention to provide a method for regulating a switched-mode power supply and also a switched-mode power supply which overcome the above-mentioned disadvantages of the prior art apparatus and methods of this general type.

In particular, it is an object of the invention to provide a method for regulating a switched-mode power supply and also a switched-mode power supply using simple means without a high outlay in such a way that when the frequency is lowered, disturbances in the load are largely avoided.

With the foregoing and other objects in view there is provided, in accordance with the invention, a method for regulating a switched-mode power supply that includes steps of: providing a switched-mode power supply having at least one electronic switch and a drive circuit having an input for receiving a primary current simulation, the switched mode power supply supplying a relatively higher output power at times and a relatively lower output power at other times; as an output load decreases, lowering a switching frequency to reduce switching losses; and starting the step of lowering the switching frequency during an occurrence of the lower output power by, during a switch-on interval of the electronic switch, deforming a rise in a voltage at the input for receiving the primary current simulation such that the voltage rises more steeply during a time segment. The object of the invention is achieved by virtue of the fact that the beginning of the lowering of the frequency is shifted toward lower output powers.

In accordance with an added mode of the invention, a resistive coupling network is used to generate the rise in the voltage at the input for receiving the primary current simulation.

In accordance with an added mode of the invention, a capacitive coupling network is used to generate the rise in the voltage at the input for receiving the primary current simulation.

In accordance with another mode of the invention, a switching transistor is used as the electronic switch.

With the foregoing and other objects in view there is also provided, in accordance with the invention, a switched-mode power supply, that includes at least one electronic switch, and a drive circuit having an input for receiving a primary current simulation. The drive circuit reduces a switching frequency to reduce switching losses as an output load decreases. The drive circuit provides a control voltage for the electronic switch. A coupling network couples the control voltage to the input for receiving the primary current simulation. The coupling network is designed to deform a rise in a voltage at the input for receiving the primary current simulation, during a switch-on interval of the electronic switch such that the voltage rises more steeply during a time segment. The object of the invention is achieved virtue of the fact that the control voltage for driving the electronic switch is coupled via a network to the input of the primary current simulation.

In accordance with an added feature of the invention, the coupling network is a resistive resistor network.

In accordance with an additional feature of the invention, the resistor network is a voltage divider including two resistors.

In accordance with another feature of the invention, the power supply includes: a parallel circuit including a first resistor and a first capacitor connected in parallel with the first resistor; a series circuit including a junction point, a second capacitor, and a second resistor connected in series with second resistor at the junction point; a third resistor; a transformer having a primary winding with a first connection and a second connection, the transformer having a secondary winding for connecting to a load to supply current to the load; a third capacitor; a fourth resistor; and a supply voltage and a reference-ground potential. The drive circuit is either the Infineon Technologies module TDA 16846 or the Infineon Technologies module TDA 16847. The module includes a pin 1, a pin 2, and a pin 13. The parallel circuit connects pin 1 of the module to the reference-ground potential. Pin 2 is the input for receiving the primary current simulation. The series circuit connects pin 2 to the reference-ground potential. The electronic switch is a switching transistor having a gate electrode, a source electrode, and a drain electrode. pin 13 of the module is connected to the gate electrode of the switching transistor. The third resistor connects pin 13 of the module to the junction point between the second capacitor and the second resistor. The source electrode of the switching transistor is connected to the reference-ground potential. The drain electrode of the switching transistor is connected to the first connection of the primary winding of the transformer. The second connection of the primary winding of the transformer is connected to the supply voltage. The third capacitor connects the second connection of the primary winding of the transformer to the reference-ground potential. The fourth resistor connects pin 2 of the module to the supply voltage.

In accordance with a further feature of the invention, the switched-mode power supply includes: a parallel circuit including a first resistor and a first capacitor connected in parallel with the first resistor; a transformer having a primary winding with a first connection and a second connection, the transformer having a secondary winding for connecting to a load to supply current to the load; a second capacitor; a second resistor; an RC element including a third resistor and a third capacitor connected in series with the third resistor; a fourth capacitor; and a supply voltage and a reference-ground potential. The drive circuit can be either an Infineon Technologies module TDA 16846 or an Infineon Technologies module TDA 16847. The module includes a pin 1, a pin 2, and a pin 13. The parallel circuit connects pin 1 of the module to the reference-ground potential. Pin 2 is the input for receiving the primary current simulation. The second capacitor connects pin 2 to the reference-ground potential. The electronic switch is a switching transistor having a gate electrode, a source electrode, and a drain electrode. Pin 13 of the module is connected to the gate electrode of the switching transistor. Pin 13 of the module is feedback-connected to pin 2 by the RC-element. The source electrode of the switching transistor is connected to the reference-ground potential. The drain electrode of the switching transistor is connected to the first connection of the primary winding of the transformer. The second connection of the primary winding of the transformer is connected to the supply voltage. The fourth capacitor connects the second connection of the primary winding of the transformer to the reference-ground potential. The second resistor connects pin 2 of the module to the supply voltage.

In accordance with a further added feature of the invention, the coupling network is a capacitive network.

In accordance with a further additional feature of the invention, the capacitive network is an RC element including a resistor and a capacitor connected in series with the resistor.

In accordance with yet an added feature of the invention, the electronic switch is a switching transistor.

With the foregoing and other objects in view there is also provided, in accordance with the invention, a switched-mode power supply that includes: at least one electronic switch having a switch-on interval; a drive circuit having an input for receiving a primary current simulation, the drive circuit reducing a switching frequency to reduce switching losses as an output load decreases; a terminal for receiving a reference-ground potential; a terminal for receiving a supply voltage; and a network connected between the reference-ground potential, the supply voltage, and the input of the drive circuit for receiving the primary current simulation. The network is designed to deform a rise in a voltage at the input during the switch-on interval of the electronic switch such that the voltage rises more steeply during a time segment.

In accordance with an added feature of the invention, the network includes a series circuit with a resistor and a capacitor; the input for receiving the primary current simulation is connected to a reference-ground potential; and the network includes a further resistor connecting the input for receiving the primary current simulation to a supply voltage.

In accordance with an additional feature of the invention, the network includes a series circuit with a resistor, a capacitor, and a parallel circuit having a further resistor and a diode. The parallel circuit connects the input for receiving the primary current simulation to the reference-ground potential. The network includes a further resistor that connects the input for receiving the primary current simulation to the supply voltage.

In accordance with another feature of the invention, the network includes a series circuit having a capacitor and a parallel circuit that is connected in series with the capacitor. The parallel circuit includes a first branch and a second branch connected in parallel with the first branch. The first branch includes a resistor. The second branch includes two diodes that are connected in series. The network includes a further resistor that connects the input for receiving the primary current simulation to a supply voltage.

In accordance with a further feature of the invention, the switched-mode power supply includes: a parallel circuit including a first resistor and a first capacitor connected in parallel with the first resistor; a transformer having a primary winding with a first connection and a second connection; an RC element including a third resistor and a third capacitor connected in series with the third resistor; a fourth capacitor; and a supply voltage and a reference-ground potential. The drive circuit is either an Infineon Technologies module TDA 16846 or an Infineon Technologies module TDA 16847. The module includes a pin 1, a pin 2, and a pin 13. The parallel circuit connects pin 1 of the module to the reference-ground potential. Pin 2 is the input for receiving the primary current simulation. The electronic switch is a switching transistor having a gate electrode, a source electrode, and a drain electrode. Pin 13 of the module is connected to the gate electrode of the switching transistor. Pin 13 of the module is feedback-connected to pin 2 by the RC-element. The source electrode of the switching transistor is connected to the reference-ground potential. The drain electrode of the switching transistor is connected to the first connection of the primary winding of the transformer. The second connection of the primary winding of the transformer is connected to the supply voltage. The fourth capacitor connects the second connection of the primary winding of the transformer to the reference-ground potential.

In accordance with an added feature of the invention, the electronic switch is a switching transistor.

By shifting the beginning of the lowering of the frequency toward lower output powers, the frequency jumps no longer occur in a power range where they cause disturbance, but rather can be shifted in a targeted manner, by skillfully selecting the beginning of the lowering of the frequency, into a power range where they no longer cause disturbance. In circuit terms, this method is realized by coupling the control voltage to the input of the primary current simulation by means of a network. This network may be embodied as a resistive or capacitive network. The network provided according to the invention deforms the voltage rise at the input of the primary current simulation of the evaluation circuit during the switch-on time of the electronic switch in such a way that a definable relationship exists between the frequency and the electrical power via the regulating voltage.

Other features which are considered as characteristic for the invention are set forth in the appended claims.

Although the invention is illustrated and described herein as embodied in a method for regulating a switched-mode power supply and a switched-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 shows a prior art switched-mode power supply;

FIG. 7 shows a third exemplary embodiment of the switched-mode power supply;

DESCRIPTION OF THE PREFERRED EMBODIMENTS

Figure 1:
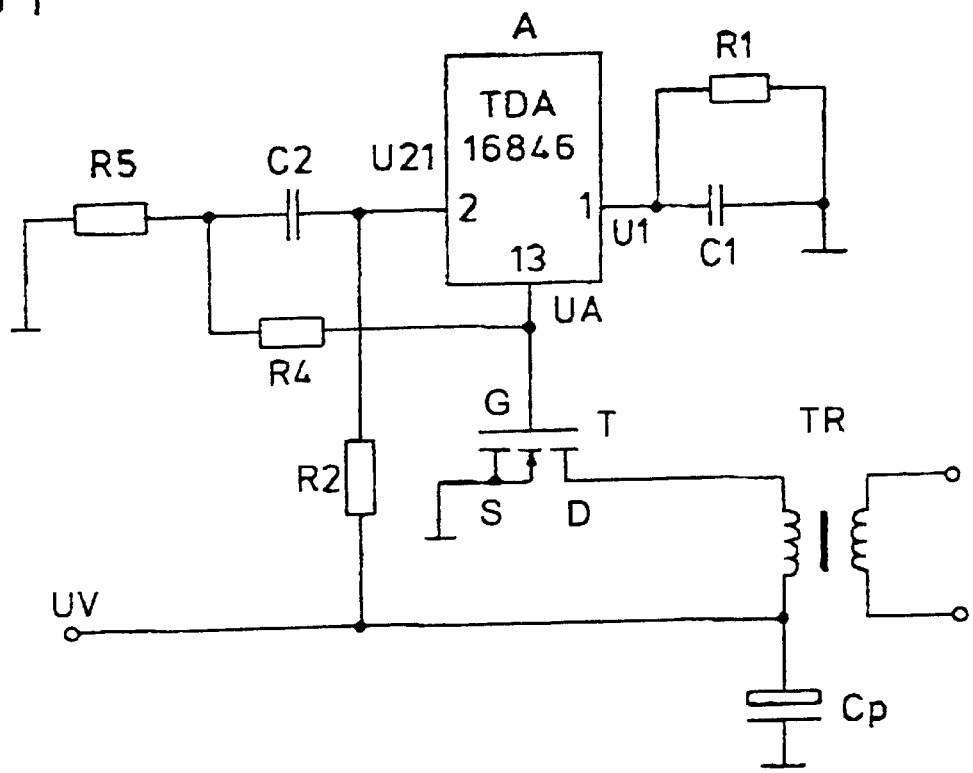
FIG. 1 shows a first exemplary embodiment of a switched-mode power supply.

Referring now to the figures of the drawing in detail and first, particularly, to FIG. 1 thereof, there is shown a first exemplary embodiment of a switched-mode power supply.

Infineon Technologies module TDA 16846 is used for the drive circuit of the switched-mode power supply shown in FIG. 1. Technical information relating to this module can be found by referring to Data Sheet 2000-01-14 that is published by Infineon Technologies AG i. Gr., St.-Martin-Strasse 53, D-81541 Munich Germany and that is hereby incorporated by reference. The data sheet is also available on the Internet by referring to:

http://www.infineon.com/cmc_upload/0/000/018/175/ S_TDA1684X.pd f. As shown in FIG. 1 of the application, pin 1 of module TDA 16846 is connected to reference-ground potential via a parallel circuit including a resistor R1 and a capacitor C1. Pin 2—the input for the primary current simulation—of the module TDA 16846 is connected to reference-ground potential via a capacitor C2 and a resistor R5 that are connected in series. Moreover, a supply voltage UV is connected to pin 2 via a resistor R2. Pin 13 of the module TDA 16846, at which the control voltage can be tapped off, is connected to the gate electrode G of a switching transistor T. Pin 13 is also connected, via a resistor R4, to the common junction point between the capacitor C2 and the resistor R5. The source electrode S of the switching transistor T is connected to reference-ground potential while the drain electrode D of the switching transistor T is connected to a first connection of the primary winding of a transformer TR. The transformer TR has a secondary winding that can be connected to a load. The second connection of the primary winding of the transformer TR is connected directly to the supply voltage UV. The second connection of the primary winding of the transformer TR is also connected, via a capacitor CP, preferably an electrolytic capacitor, to reference-ground potential.

The coupling path, including the resistors R4 and R5, deforms the voltage rise in the voltage U2 at pin 2 of the module TDA 16846 during the switch-on interval of the switching transistor T in such a way that a defined relationship is produced between the frequency and the electrical power, via the regulating voltage UR. The exact mode of operation is explained using the second exemplary embodiment of the switched-mode power supply shown in FIG. 2.

Figure 2:
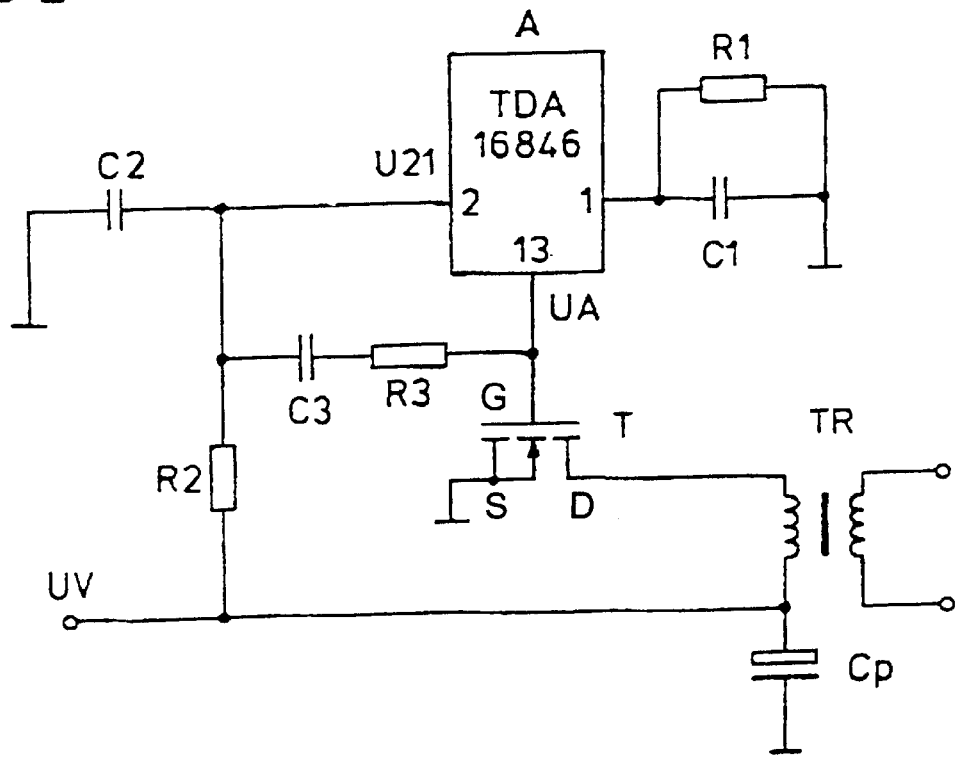
FIG. 2 shows a second exemplary embodiment of the switched-mode power supply.

Similarly to the first exemplary embodiment of the drive circuit, Infineon Technologies module TDA 16846 is provided for the second exemplary embodiment of a switched-mode power supply as shown in FIG. 2. In the same way as in the first exemplary embodiment, pin 1 of the module TDA 16846 is connected to reference-ground potential via a parallel circuit including a resistor R1 and a capacitor C1. Pin 13 of the module TDA 16846 is directly connected to the gate electrode G of a switching transistor T. The source electrode S of the switching transistor T is connected to reference-ground potential and the drain electrode D of the switching transistor T is connected to a first connection of the primary winding of a transformer TR. Pin 13 of the module TDA 16846 is connected to pin 2, the input for the primary current simulation, of the module TDA 16846 via an RC element including a series circuit with a resistor R3 and a capacitor C3. Moreover, pin 2 is connected to reference-ground potential via a capacitor C2. Pin 2 is also connected to the supply voltage UV via a resistor R2. The supply voltage UV is likewise connected to the second connection of the primary winding of the transformer TR. The second connection of the primary winding of the transformer TR is connected to reference-ground potential via a capacitor CP. The load that will be supplied with current can be connected to the secondary winding of the transformer TR.

Figure 3:
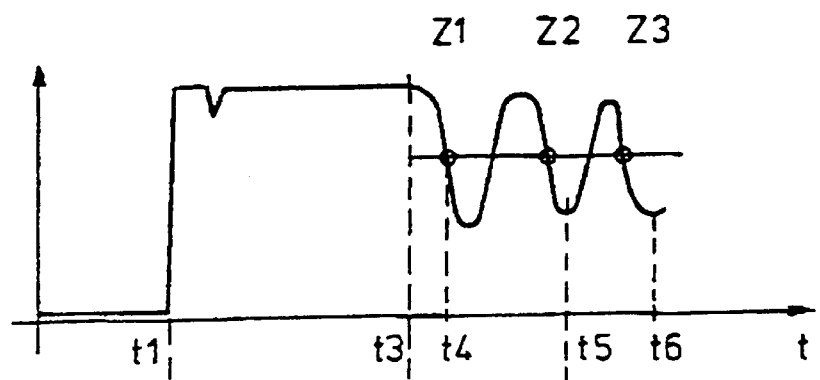
FIG. 3 shows the drain voltage of a switching transistor.
Figure 4:
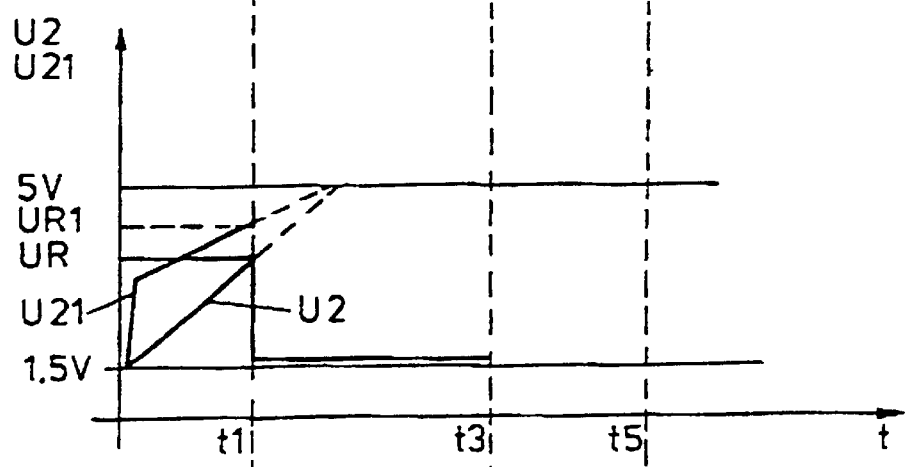
FIG. 4 shows the regulating voltage and the voltage at the input of the primary current simulation.
Figure 5:
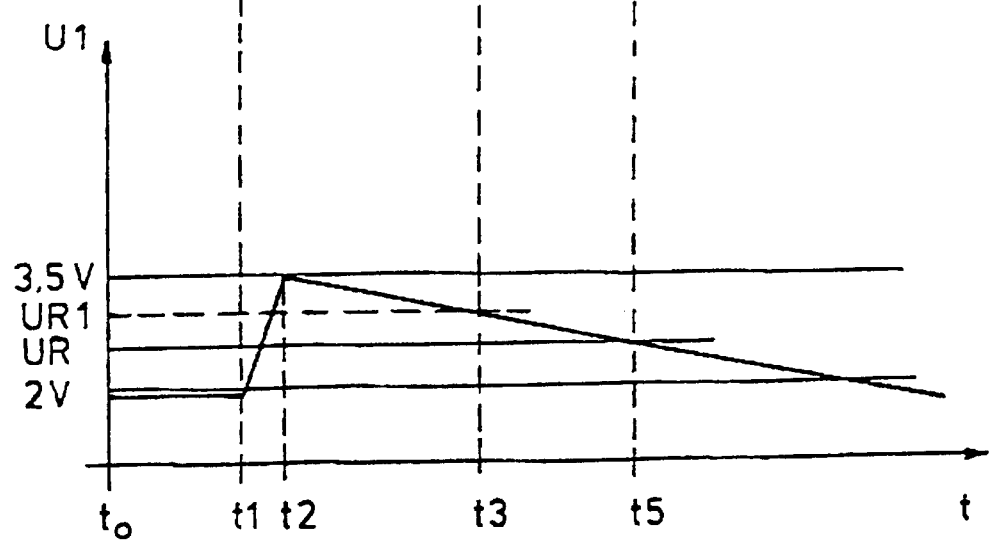
FIG. 5 shows the regulating voltage and the voltage at an input of the drive circuit.

The exemplary embodiments of the switched-mode power supply that are shown in FIGS. 1 and 2 will now be explained using the voltage diagrams that are illustrated in FIGS. 3 to 5.

To more simply explain the mode of operation of the exemplary embodiment shown in FIG. 2, first the function of a prior art switched-mode power supply will be explained. FIG. 6 shows a prior art switched-mode power supply that does not include the RC element with the resistor R3 and the capacitor C3 that is included in the second exemplary embodiment shown in FIG. 2. During the switch-on interval of the switching transistor T, the capacitor C2 is charged via the resistor R2, which is connected to the supply voltage UV and to one electrode of the capacitor CP. The voltage rise U2 across the capacitor C2 simulates the rise in the primary current in the primary winding of the transformer TR. The rise in the primary current in the primary winding of the transformer TR and the rise in the voltage U2 at pin 2 of the module TDA 16846 take place virtually linearly. The primary current simulation determines the switch-off instant of the switching transistor, which is reached when the voltage U2 at pin 2 exceeds the regulating voltage UR, which is the case at the instant t1. In the case of the module TDA 16846, not only the switch-on time of the switching transistor T, but also the time from the switch-off until the next switch-on is defined depending on the regulating voltage UR. The time is defined by the RC element including the resistor R1 and the capacitor C1, which is connected to pin 1 of the module TDA 16846. During the so-called ringing suppression time t1–t2, the capacitor C1 is charged internally to a constant voltage value, preferably 3.5 volts, and is then discharged through the resistor R1. As soon as the voltage U1 at pin 1 falls below the regulating voltage UR, the enabling is granted for switching on the switching transistor T at the next zero crossing. The enabling is effected at the instant t5, whereas the next switch-on is effected at the instant t6.

FIG. 3 illustrates the drain voltage of the switching transistor T in a switched-mode power supply according to the invention with the feedback network.

FIG. 4 shows the voltage U2 at pin 2 of the module TDA 16846 in a switched-mode power supply without the coupling network according to the invention, and also the voltage U21 at pin 2 in a switched-mode power supply with the coupling network according to the invention.

FIG. 5 shows the voltage U1 at pin 1 of the module TDA 16846 and also the regulating voltage UR in a switched-mode power supply without the coupling network according to the invention and the regulating voltage UR1 in a switched-mode power supply with the coupling network according to the invention.

In a switched-mode power supply without the inventive coupling network, the voltage U2 at pin 2 of the module TDA 16846 rises linearly up to the turning point P, which is set at a voltage of 5 volts, for example. At the point of intersection between the voltage U2 and the on-chip regulating voltage UR at the instant t1, the switching transistor T is switched off. If the inventive coupling network, which is the RC element including the resistor R3 and the capacitor C3 (FIG. 2), is now incorporated into the switched-mode power supply, then the voltage U21 at pin 2 has a different profile. It initially rises more steeply than the voltage U2, but then effects a kink and intersects the regulating voltage UR1 at the same instant t1, the regulating voltage UR1 being larger in the switched-mode power supply with the inventive coupling network than in the switched-mode power supply without the inventive coupling network. The turning point fixed at 5 volts lies at the same position both in the inventive switched-mode power supply and in the switched-mode power supply without the inventive coupling network.

For this reason, the maximum power that can be drawn from the switched-mode power supply has remained unchanged. The identical position of the turning point is achieved by skillfully dimensioning the resistor R2 after the incorporation of the RC element including the capacitor C3 and the resistor R3. The regulation ensures that even after the incorporation of the RC element, with the output load unchanged, the switch-on interval between the instants t0 and t1 acquires the correct value. Because of the increased frequency, the switch-on interval becomes somewhat smaller in the switched-mode power supply with the inventive RC element. The regulation raises the regulating voltage from the value UR to the value UR1. The voltage U21 intersects the regulating voltage UR1 at the same instant t1 as the voltage U2 intersects the regulating voltage UR in the switched-mode power supply without the inventive RC element. In the inventive switched-mode power supply, the somewhat higher regulating voltage UR1 shortens the waiting time until the next switch-on of the switching transistor T, because the point of intersection between the voltage U1 and the regulating voltage UR1 lies at the instant t3 and no longer at the later instant t5. For this reason, the switching transistor T is already switched on again upon the first zero crossing Z1 of its drain voltage Ud at the instant t4. Since the switching transistor T is already switched on again upon the first zero crossing Z1, the load range is extended downward. The extent to which the load range is extended downward depends on the ratio of the capacitor C3 to the capacitor C2. It has proved to be advantageous to fix the value of the capacitor C3 at about 10% of the value of the capacitor C2. Suitable values are 470 pF, for example, for the capacitor C2 and, accordingly, 47 pF for the capacitor C3. The steep rise in the voltage U21 is flattened somewhat by the series resistor R3. The resistor R3 prevents the frequency from being increased in the case of a very small load—for example in the standby mode—by the RC element including the capacitor C3 and the resistor R3. This is because the switch-on duration already becomes very short in the case of a relatively high voltage U21. Therefore, the resistor R3 is necessary only in the case of relatively large values of the capacitor C3. In the case of relatively small values of the capacitor C3, the resistor R3 can be replaced by a short circuit.

In the inventive switched-mode power supply, splitting the voltage profile of the voltage U21 into a steep part and a shallow part also favorably changes the regulation slope. In the steep part, that is to say with small output powers, the regulation slope is decreased, which prevents the risk of regulation oscillations. In the shallow part of the voltage U21, by contrast, the regulation slope is increased, so that a change in the regulating voltage leads to a relatively large change in the switch-on interval of the switching transistor T. In the case of the module TDA 16846, this has a favorable effect on the antijitter circuit that is incorporated in the module, because a change in the period duration through the omission of zero crossings has a less pronounced effect on the regulating voltage. Therefore, the change in the regulating voltage can be compensated more easily.

Figure 8:
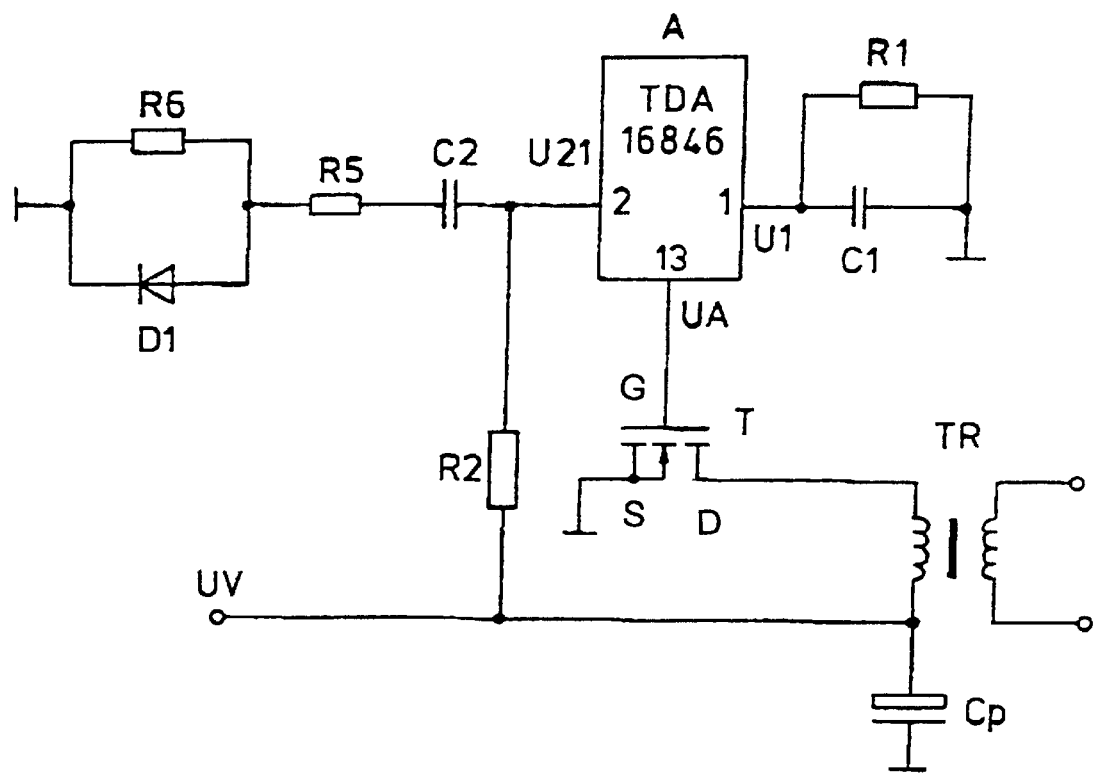
FIG. 8 shows a fourth exemplary embodiment of the switched-mode power supply.
Figure 9:
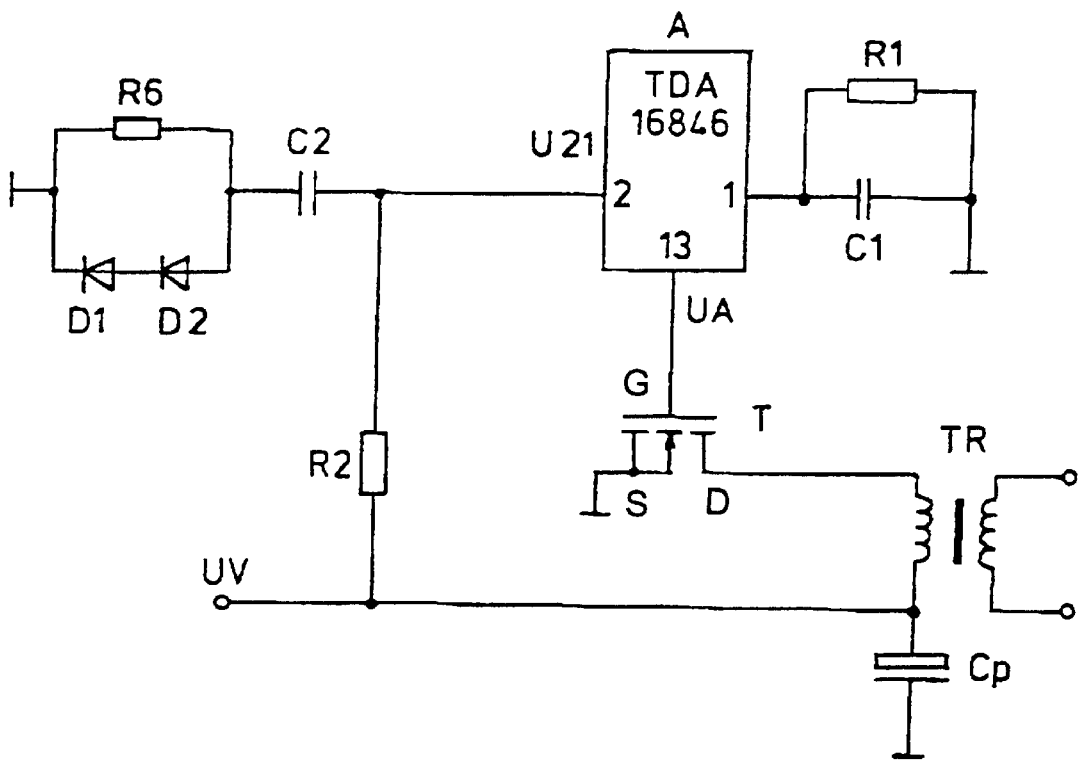
FIG. 9 shows a fifth exemplary embodiment of the switched-mode power supply.

Further exemplary embodiments of the invention are illustrated in FIGS. 7, 8 and 9, which manage without the coupling network.

The third exemplary embodiment of the invention as shown in FIG. 7 will now be described and explained. As in the previous n exemplary embodiments, pin 1 of the Infineon Technologies module TDA 16846 is connected to reference-ground potential via a parallel circuit including a resistor R1 and a capacitor C1. A supply voltage UV is connected to pin 2 via a resistor R2. Pin 13, at which the control voltage can be tapped off, is connected to the gate electrode G of a switching transistor T. The source electrode S of the switching transistor T is connected to reference-ground potential, while the drain electrode D of the transistor T is connected to a first connection of the primary winding of the transformer TR. The transformer TR has a secondary winding that can be connected to a load. The second connection of the primary winding of the transformer TR is connected directly to the supply voltage UV, and via a capacitor CP, preferably an electrolytic capacitor, to reference-ground potential.

Pin 2 of the Infineon Technologies module TDA 16846 is connected to reference-ground potential via a capacitor C2 and a resistor R5 that is connected in series with the capacitor C2.

The third exemplary embodiment of the inventive switched-mode power supply constitutes a simplified variant of the first exemplary embodiment represented in FIG. 1, in which the coupling resistor R4 between pin 13 and the junction point between the resistor R5 and the capacitor C2 is omitted. The deformation of the voltage rise at pin 2 is done solely through the resistor RS. The voltage jump in the voltage at pin 2 is brought about by the voltage drop in the resistor R5, which is generated by the charging current through the resistor R2, which also flows through the capacitor C2 and through the resistor R5, at the beginning of the switch-on time of the switching transistor T. Since the magnitude of the voltage jump is proportional to the supply voltage UV in the third exemplary embodiment of the inventive switched-mode power supply, the effect of "turning point tracking" arises, that is to say, in the case of a higher supply voltage UV, the 5 V limit is reached earlier at pin 2 because of the higher voltage jump. The maximum possible output power can thus be made approximately independent of the supply voltage UV in free-running switched-mode power supplies.

The fourth exemplary embodiment of the inventive switched-mode power supply as shown in FIG. 8 will now be described and explained. It differs from the third exemplary embodiment shown in FIG. 7 in that the resistor R5 is not connected to reference-ground potential directly, but via a parallel circuit including a resistor R6 and a diode D1.

The parallel circuit including the resistor R6 and the diode D1 further increases the voltage jump in the voltage at pin 2, in particular in a long-range power supply, in order to further postpone the beginning of the lowering of the frequency as the output load decreases. This is because simply increasing the value of the resistor R5 would bring about excessively great turning point tracking. Therefore, a diode D1 is additionally connected in series with the resistor R5. This diode D1 generates a current-independent voltage drop, to be precise, that of a diode forward voltage. The resistor R5 is preferably dimensioned such that the turning point tracking is brought about to the desired extent. The resistor R6, which is connected in parallel with the diode D1, enables the reverse current that is required for the charge reversal of the capacitor C2 after the end of the switch-on time.

The fifth exemplary embodiment of the inventive switched-mode power supply as represented in FIG. 9 will now be described and explained. In the fifth exemplary embodiment shown in FIG. 9, a further diode D2 is connected in series with the diode D1. The series circuit of the two diodes D1 and D2 results in a relatively high voltage jump in the voltage at pin 2. The beginning of the lowering of the frequency can then be shifted toward very small powers or can even be completely cancelled. The resistor R5, which is duplicated in FIG. 8 for the turning point tracking, can be dispensed with here because the small current dependence of the voltage drop at the series circuit of the two diodes D1 and D2 already brings about the desired effect of turning point tracking.

The invention affords the developer and the user with the major advantage of being able to choose the frequency response of the inventive switched-mode power supply in a comparatively large range and of thus, being able to match it optimally to the load that will be supplied by the switched-mode power supply. In addition to the Infineon Technologies module TDA 16846 already mentioned, the Infineon Technologies modules TDA 16847, TDA 16848, TDA 16849, TDA 4605-2 and TDA 4605-3 are also suitable as drive circuits for the inventive switched-mode power supply. However, the invention is not restricted to the Infineon Technologies modules mentioned, because the invention's measure of coupling the control voltage to the input of the primary current simulation via a network can be realized in all drive modules with a primary current simulation.

The invention can be used particularly advantageously in television sets, because it does not corrupt the picture geometry. This advantage is obtained using simple and very inexpensive means, because the drive circuit, compared with the prior art, only has to be supplemented with a coupling network including two resistors or an RC element.

I claim:

1. A method for regulating a switched-mode power supply, which comprises:
   providing a switched-mode power supply having at least one electronic switch and a drive circuit having an input receiving a primary current simulation, the switched mode power supply supplying a relatively higher output power at times and a relatively lower output power at other times;
   as an output load decreases, lowering a switching frequency to reduce switching losses; and
   starting the step of lowering the switching frequency during an occurrence of the lower output power by, during a switch-on interval of the electronic switch, deforming a rise in a voltage at the input for receiving the primary current simulation such that the voltage rises more steeply during a time segment.

2. The method according to claim 1, which comprises: using a resistive coupling network to generate the rise in the voltage at the input for receiving the primary current simulation.

3. The method according to claim 1, which comprises: using a capacitive coupling network to generate the rise in the voltage at the input for receiving the primary current simulation.

4. The method according to claim 1, which comprises: using a switching transistor as the electronic switch.

5. A switched-mode power supply, comprising:
   at least one electronic switch;
   a drive circuit having an input for receiving a primary current simulation, said drive circuit reducing a switching frequency to reduce switching losses as an output load decreases, said drive circuit providing a control voltage for said electronic switch;
   a coupling network coupling said control voltage to said input for receiving the primary current simulation;
   said coupling network designed to deform a rise in a voltage at said input for receiving the primary current simulation, during a switch-on interval of said electronic switch such that said voltage rises more steeply during a time segment.

6. The switched-mode power supply according to claim 5, wherein said coupling network is a resistive resistor network.

7. The switched-mode power supply according to claim 6, wherein said resistor network is a voltage divider including two resistors.

8. The switched-mode power supply according to claim 7, comprising:
   a parallel circuit including a first resistor and a first capacitor connected in parallel with said first resistor;
   a series circuit including a junction point, a second capacitor, and a second resistor connected in series with second resistor at said junction point;
   a third resistor;
   a transformer having a primary winding with a first connection and a second connection, said transformer having a secondary winding for connecting to a load to supply current to the load;
   a third capacitor;
   a fourth resistor; and
   a supply voltage and a reference-ground potential;
   said drive circuit being a module selected from the group consisting of Infineon Technologies module TDA 16846 and Infineon Technologies module TDA 16847;

said module including a pin 1, a pin 2, and a pin 13;

said parallel circuit connecting said-pin 1 of said module to said reference-ground potential;

said pin 2 being said input for receiving the primary current simulation;

said series circuit connecting said pin 2 to said reference-ground potential;

said electronic switch being a switching transistor having a gate electrode, a source electrode, and a drain electrode;

said pin 13 of said module connected to said gate electrode of said switching transistor;

said third resistor connecting said pin 13 of said module to said junction point between said second capacitor and said second resistor;

said source electrode of said switching transistor connected to said reference-ground potential;

said drain electrode of said switching transistor connected to said first connection of said primary winding of said transformer;

said second connection of said primary winding of said transformer connected to said supply voltage;

said third capacitor connecting said second connection of said primary winding of said transformer to said reference-ground potential; and said fourth resistor connecting said pin 2 of said module to said supply voltage.

9. The switched-mode power supply according to claim 7, comprising:

a parallel circuit including a first resistor and a first capacitor connected in parallel with said first resistor;

a transformer having a primary winding with a first connection and a second connection, said transformer having a secondary winding for connecting to a load to supply current to the load;

a second capacitor;

a second resistor;

an RC element including a third resistor and a third capacitor connected in series with said third resistor;

a fourth capacitor; and a supply voltage and a reference-ground potential;

said drive circuit being a module selected from the group consisting of Infineon Technologies module TDA 16846 and Infineon Technologies module TDA 16847;

said module including a pin 1, a pin 2, and a pin 13;

said parallel circuit connecting said pin 1 of said module to said reference-ground potential;

said pin 2 being said input for receiving the primary current simulation;

said second capacitor connecting said pin 2 to said reference-ground potential;

said electronic switch being a switching transistor having a gate electrode, a source electrode, and a drain electrode;

said pin 13 of said module connected to said gate electrode of said switching transistor;

said pin 13 of said module being feedback-connected to said pin 2 by said RC-element;

said source electrode of said switching transistor connected to said reference-ground potential;

said drain electrode of said switching transistor connected to said first connection of said primary winding of said transformer;

said second connection of said primary winding of said transformer connected to said supply voltage;

said fourth capacitor connecting said second connection of said primary winding of said transformer to said reference-ground potential; and said second resistor connecting said pin 2 of said module to said supply voltage.

10. The switched-mode power supply according to claim 5, wherein said coupling network is a capacitive network.

11. The switched-mode power supply according to claim 10, wherein said capacitive network is an RC element including a resistor and a capacitor connected in series with said resistor.

12. The switched-mode power supply according to claim 5, wherein said electronic switch is a switching transistor.

13. A switched-mode power supply, comprising:

at least one electronic switch having a switch-on interval;

a drive circuit having an input for receiving a primary current simulation, said drive circuit reducing a switching frequency to reduce switching losses as an output load decreases;

a terminal for receiving a reference-ground potential, and a terminal for receiving a supply voltage;

a network connected between the reference-ground potential, the supply voltage, and said input of said drive circuit for receiving said primary current simulation;

said network being designed to deform a rise in a voltage at said input during said switch-on interval of said electronic switch such that the voltage rises more steeply during a time segment.

14. The switched-mode power supply according to claim 13, wherein:

said network includes a series circuit with a resistor and a capacitor;

said input for receiving the primary current simulation is connected to a reference-ground potential; and said network includes a further resistor connecting said input for receiving the primary current simulation to a supply voltage.

15. The switched-mode power supply according to claim 13, wherein:

said network includes a series circuit with a resistor, a capacitor, and a parallel circuit having a further resistor and a diode;

said parallel circuit connects said input for receiving the primary current simulation to the reference-ground potential; and said network includes a further resistor connecting said input for receiving the primary current simulation to the supply voltage.

16. The switched-mode power supply according to claim 13, wherein:

said network includes a series circuit having a capacitor and a parallel circuit that is connected in series with said capacitor;

said parallel circuit includes a first branch and a second branch connected in parallel with said first branch;

said first branch includes a resistor;

said second branch includes two diodes that are connected in series; and said network includes a further resistor connecting said input for receiving the primary current simulation to a supply voltage.

17. The switched-mode power supply according to claim 13, comprising:
- a parallel circuit including a first resistor and a first capacitor connected in parallel with said first resistor;
- a transformer having a primary winding with a first connection and a second connection;
- an RC element including a third resistor and a third capacitor connected in series with said third resistor;
- a fourth capacitor; and
- a supply voltage and a reference-ground potential;
- said drive circuit being a module selected from the group consisting of Infineon Technologies module TDA 16846 and Infineon Technologies module TDA 16847;
- said module including a pin 1, a pin 2, and a pin 13;
- said parallel circuit connecting said pin 1 of said module to said reference-ground potential;
- said pin 2 being said input for receiving the primary current simulation;
- said electronic switch being a switching transistor having a gate electrode, a source electrode, and a drain electrode;
- said pin 13 of said module connected to said gate electrode of said switching transistor;
- said pin 13 of said module being feedback-connected to said pin 2 by said RC-element;
- said source electrode of said switching transistor connected to said reference-ground potential;
- said drain electrode of said switching transistor connected to said first connection of said primary winding of said transformer;
- said second connection of said primary winding of said transformer connected to said supply voltage; and
- said fourth capacitor connecting said second connection of said primary winding of said transformer to said reference-ground potential.

18. The switched-mode power supply according to claim 13, wherein said electronic switch is a switching transistor.

* * * * *